(12) United States Patent
Yang

(10) Patent No.: US 12,529,494 B2
(45) Date of Patent: Jan. 20, 2026

(54) AIR CONDITIONER CONTROL METHOD AND AIR CONDITIONER

(71) Applicants: HANDAN MIDEA AIR-CONDITIONING EQUIPMENT CO., LTD., Handan (CN); GD MIDEA AIR-CONDITIONING EQUIPMENT CO., LTD., Foshan (CN)

(72) Inventor: Jian Yang, Handan (CN)

(73) Assignees: HANDAN MIDEA AIR-CONDITIONING EQUIPMENT CO., LTD., Handan (CN); GD MIDEA AIR-CONDITIONING EQUIPMENT CO., LTD, Foshan (CN)

( * ) Notice: Subject to any disclaimer, the term of this patent is extended or adjusted under 35 U.S.C. 154(b) by 381 days.

(21) Appl. No.: 18/033,022

(22) PCT Filed: Mar. 31, 2021

(86) PCT No.: PCT/CN2021/084528
§ 371 (c)(1),
(2) Date: Apr. 20, 2023

(87) PCT Pub. No.: WO2022/095330
PCT Pub. Date: May 12, 2022

(65) Prior Publication Data
US 2023/0400214 A1    Dec. 14, 2023

(30) Foreign Application Priority Data
Nov. 6, 2020    (CN) .......................... 202011233546.3

(51) Int. Cl.
*F24F 11/79*    (2018.01)
*F24F 13/14*    (2006.01)

(52) U.S. Cl.
CPC ........... *F24F 11/79* (2018.01); *F24F 13/1426* (2013.01)

(58) Field of Classification Search
CPC ........ F24F 11/79; F24F 13/1426; F24F 11/48; F24F 11/74; F24F 13/10; F24F 11/64
See application file for complete search history.

(56) References Cited

FOREIGN PATENT DOCUMENTS

CN    1147615 A    *    4/1997
CN    106091298 A        11/2016
(Continued)

OTHER PUBLICATIONS

English Translation of "JP-H09145127-A" (Year: 1997).*
(Continued)

*Primary Examiner* — Charles R Kasenge
(74) *Attorney, Agent, or Firm* — Anova Law Group, PLLC

(57) ABSTRACT

An air conditioner control method includes determining an operation state of an air conditioner after the air conditioner is powered up, controlling an air deflector rotatably installed at an air outlet of the air conditioner to restore according to the operation state, and controlling the air deflector to adjust an air outlet angle according to an angle after restoration. Controlling the air deflector to restore includes, in response to the operation state being a turn-on state, controlling the air deflector to restore to a restoration angle that is a maximum opening angle of the air deflector when opening to expose the air outlet, and, during rotation of the air deflector, controlling air output of the air conditioner according to a rotation angle of the air deflector.

10 Claims, 11 Drawing Sheets

(56) References Cited

FOREIGN PATENT DOCUMENTS

| | | | |
|---|---|---|---|
| CN | 106895548 | A | 6/2017 |
| CN | 107345706 | A | 11/2017 |
| CN | 109297096 | A | 2/2019 |
| CN | 109612056 | A | 4/2019 |
| CN | 110195906 | A | 9/2019 |
| CN | 110274366 | A | 9/2019 |
| CN | 110500697 | A | 11/2019 |
| CN | 110986330 | A | 4/2020 |
| CN | 111735188 | A | 10/2020 |
| CN | 112178892 | A | 1/2021 |
| EP | 3617611 | A1 | 3/2020 |
| IN | 111561774 | A | 8/2020 |
| JP | H09145127 | A * | 6/1997 |
| JP | 2002267280 | A | 9/2002 |
| KR | 20000003146 | A | 1/2000 |
| WO | 2018196783 | A1 | 11/2018 |

OTHER PUBLICATIONS

English Translation of "CN-1147615-A" (Year: 1997).*
The China National Intellectual Property Administration (CNIPA) The review decision for Chinese Application 202011233546.3 Dec. 12, 2024 24 Pages (With Translation).
The China National Intellectual Property Administration (CNIPA) The Notification of Reexamination for Chinese Application 202011233546.3 Oct. 28, 2024 16 Pages (With Translation).
The European Patent Office (EPO) The Extended European Search Report for 21888034.2 Mar. 5, 2024 9 Pages.
The World Intellectual Property Organization (WIPO) International Search Report and Written Opinion for PCT/CN2021/084528 Jul. 15, 2021 12 Pages (including translation).
The China National Intellectual Property Administration (CNIPA) The First Office Action for Chinese Application 202011233546.3 Jul. 2, 2021 17 Pages (With Translation).
The China National Intellectual Property Administration (CNIPA) The Second Office Action for Chinese Application 202011233546.3 Dec. 30, 2021 18 Pages (With Translation).
The China National Intellectual Property Administration (CNIPA) The Third Office Action for Chinese Application 202011233546.3 Mar. 3, 2022 15 Pages (With Translation).

* cited by examiner

AIR CONDITIONER CONTROL METHOD AND AIR CONDITIONER

CROSS-REFERENCE TO RELATED APPLICATION APPLICATIONS

This application is a National Stage Entry under 35 U.S.C. § 371 of International Application No. PCT/CN2021/084528, filed on Mar. 31, 2021, which claims priority to Chinese patent application No. 202011233546.3, entitled "AIR CONDITIONER CONTROL METHOD AND AIR CONDITIONER" and filed on Nov. 6, 2020, the disclosures of which are incorporated herein by reference in their entirety.

TECHNICAL FIELD

The present disclosure relates to the technical field of electrical appliance structures, and in particular to an air conditioner control method and an air conditioner.

BACKGROUND

In the related technology, when an air conditioner is turned on immediately after being powered up, an air deflector plate needs to be restored before being opened, and only after the air deflector plate is opened, can a fan be turned on to output air. Depending on the design of the air conditioner, a user needs to wait 8 to 30 seconds before feeling the air output, and the delayed air output compromises the user experience.

SUMMARY

The present disclosure aims to solve at least one of the technical problems in the existing technology. In view of this, the present disclosure provides an air conditioner control method which can effectively reduce the waiting time before air is output after the air conditioner is powered up, thus improving the air output efficiency and the user experience.

The present disclosure further provides an air conditioner to which the above air conditioner control method can be applied.

According to an embodiment of a first aspect of the present disclosure, an air conditioner control method is provided, which is applied to an air conditioner including an air deflector rotatably installed at an air outlet of the air conditioner. The control method includes:
  determining an operation state of the air conditioner after being powered up;
  controlling the air deflector to be restored according to the operation state, where in response to the operation state being a turn-on state, the air deflector is controlled to be restored to a first restoration angle, air output of the air conditioner is controlled according to a rotation angle of the air deflector during rotation, and the first restoration angle is a maximum opening angle of the air deflector when opening to expose the air outlet;
  controlling the air deflector to adjust an air outlet angle according to an angle after restoration.

According to some embodiments of the present disclosure, controlling air output of the air conditioner according to a rotation angle of the air deflector during rotation includes:
  controlling the air conditioner to output air in response to the air deflector rotating by a first preset angle.

According to some embodiments of the present disclosure, controlling air output of the air conditioner according to a rotation angle of the air deflector during rotation includes:
  controlling the air conditioner to output air in response to the air deflector rotating to a second preset angle.

According to some embodiments of the present disclosure, controlling the air deflector to be restored according to the operation state further includes:
  controlling the air deflector to rotate to a second restoration angle for restoration in response to the operation state being a turn-off state, the second restoration angle being greater than or equal to a minimum closing angle of the air deflector required to close the air outlet.

According to some embodiments of the present disclosure, determining an operation state of the air conditioner after being powered up further includes:
  determining a restoration state of the air deflector; and
  determining the operation state of the air conditioner in response to the restoration state being an unrestored state.

According to some embodiments of the present disclosure, determining a restoration state of the air deflector further includes:
  directly controlling the air deflector to adjust the air outlet angle according to the angle after restoration in response to the restoration state being a restored state.

According to some embodiments of the present disclosure, controlling the air deflector to adjust an air outlet angle according to an angle after restoration includes:
  controlling the air deflector to rotate from the first restoration angle to a target air outlet angle, the target air outlet angle being smaller than or equal to the maximum opening angle.

According to some embodiments of the present disclosure, controlling the air deflector to adjust an air outlet angle according to an angle after restoration further includes:
  controlling the air deflector to rotate from the second restoration angle to a target air outlet angle after the air conditioner is turned on, the target air outlet angle being greater than the minimum closing angle.

According to an embodiment of a second aspect of the present disclosure, a control apparatus is provided, including a memory, a processor and a computer program stored in the memory and executable by the processor, where the computer program, when executed by the processor, causes the processor to perform the air conditioner control method according to the embodiment of the first aspect.

According to an embodiment of a third aspect of the present disclosure, an air conditioner is provided, including the control apparatus according to the embodiment of the second aspect.

According to an embodiment in a fourth aspect of the present disclosure, a computer-readable storage medium is provided, which stores computer-executable instructions, where the computer-executable instructions are configured for implementation of the air conditioner control method of the embodiment of the first aspect.

According to the embodiments of the present disclosure, the operation state of the air conditioner after being powered up is determined, and the air deflector is controlled to be restored according to the operation state. In response to the operation state being a turn-on state, the air deflector is controlled to be restored to a first restoration angle, the first restoration angle is the maximum opening angle of the air deflector to expose the air outlet, and the first restoration angle corresponding to the air deflector is taken as the angle after restoration. In the rotating and restoring process of the air deflector, air output of the air conditioner is controlled according to the rotation angle of the air deflector, such that the air conditioner can be controlled to output air after the air deflector rotates by or to a certain angle, without the need to wait for the air deflector to be restored, so the waiting time before air is output is effectively shortened. After the air deflector is restored, the air deflector is at the maximum opening angle, and the air deflector is controlled to adjust the air outlet angle according to the angle after restoration, such that the air deflector can quickly respond to a control instruction of the air conditioner, rapid air output can be realized for cooling, heating, etc. Thus, the time for users to wait for the air to be output is reduced, and the user experience is improved.

Additional features and advantages of the present disclosure will be set forth in the subsequent description, and in part will become apparent from the description, or may be learned by practice of the present disclosure.

BRIEF DESCRIPTION OF DRAWINGS

The accompanying drawings are used to provide understanding of the technical schemes of the present disclosure and constitute a part of the description. The accompanying drawings are used to explain the technical schemes of the present disclosure together with the examples of the present disclosure, and do not constitute a restriction on the technical schemes of the present disclosure. In the accompanying drawings.

Figures 1, 2:
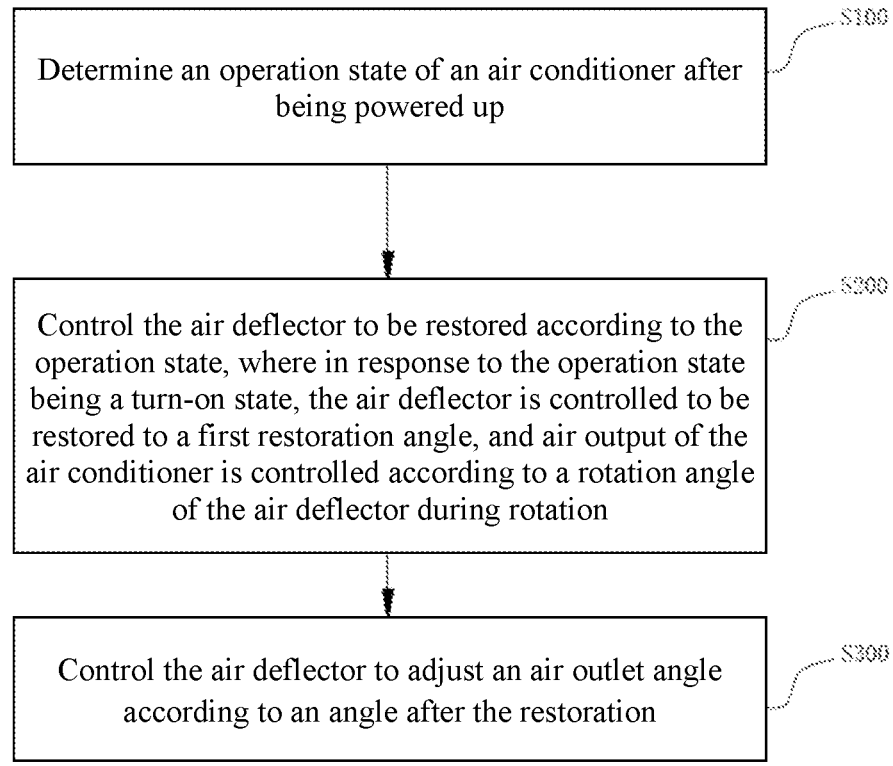
FIG. 1 is a flowchart of an air conditioner control method according to an embodiment of the present disclosure.
FIG. 2 is a flowchart of air deflector restoration in an air conditioner control method according to an embodiment of the present disclosure.

LIST OF REFERENCE NUMERALS air outlet housing 600, air inlet 610, air outlet 620, cavity 621, first boss 622, second boss 623, panel 630; air outlet hood 700, air outlet vent 710, opening 720, grille 730;

heat exchanger 800.

DETAILED DESCRIPTION

Embodiments of the present disclosure will be described in detail below. Examples of the embodiments are illustrated in the accompanying drawings, where the same or like reference numerals throughout the figures indicates the same or like elements having the same or like functions. The embodiments described below with reference to the accompanying drawings are exemplary and are intended only to explain the present disclosure instead of being construed as limiting the present disclosure.

In the description of the embodiments of the present disclosure, if "first" and "second", etc. are referred to, it is only for the purpose of distinguishing technical features, and shall not be understood as indicating or implying relative importance or implying the number of the indicated technical features or implying the sequence of the indicated technical features.

In the description of the embodiments of the present disclosure, it should be understood that, descriptions relating to orientation, for example, orientation or positional relationships indicated by up, down, left, right, etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure.

In the description of the embodiments of the present disclosure, it is to be noted that unless otherwise explicitly defined, the words such as set, install, and connect should be understood in a broad sense, and those skilled in the art can determine the specific meanings of the above words in the present disclosure in a rational way in conjunction with the specific contents of the technical schemes.

An air conditioner control method according to an embodiment of the present disclosure will be described with reference to FIGS. 1-7.

Referring to FIG. 1, the air conditioner control method according to the embodiment of the present disclosure includes but is not limited to the following steps.

At S100, an operation state of an air conditioner after being powered up is determined.

At S200, the air deflector is controlled to be restored according to the operation state. In response to the operation state being a turn-on state, the air deflector is controlled to be restored to a first restoration angle. Air output of the air conditioner is controlled according to a rotation angle of the air deflector during rotation.

At S300, the air deflector is controlled to adjust an air outlet angle according to an angle after restoration.

It can be understood that the embodiment of the application aims to restore the air deflector quickly so as to output air when the air conditioner is turned on immediately after being powered up, thus shortening the time for the air deflector to open an air outlet to output air. Specifically, after the air conditioner is powered up, the operation state of the air conditioner is obtained to determine whether the air conditioner is turned on or not; and in response to the operation state of the air conditioner being a turn-on state, that is, the air conditioner is turned on immediately after being powered up, the air deflector is controlled to be directly restored from the current angle to the first restoration angle, which is the maximum opening angle of the air deflector when opening to expose the air outlet. It can be understood that the air deflector can open or close the air outlet. When the air deflector rotates from a closed state to an open state, the opening degree of the air outlet will gradually increase, the largest opening degree of the air outlet can be understood as the maximum opening angle of the air deflector, and the air deflector is in the closed state when the opening degree of the air outlet is the smallest, at which moment the air deflector is at the minimum closing angle. When the air deflector rotates to the first restoration angle, the restoration is completed. At this point, the current angle of the air deflector is the first restoration angle, and it can also be understood that the position of the air deflector at the first restoration angle is a first initial position. For example, when the air conditioner is powered off, the air deflector stays in the middle of the air outlet, and when the air conditioner is turned on immediately after being powered up, the air deflector rotates directly from the current angle to the maximum opening angle for restoration. The maximum opening angle can be 70°, 90°, 120°, etc. Herein, the maximum opening angle is not further limited.

In addition, at S200, in the rotating and restoring process of the air deflector, the air output of the air conditioner is controlled according to the rotation angle of the air deflector. It can be understood that while the air deflector rotates towards the first restoration angle for restoration, the opening degree of the air outlet gradually increases, and when the opening degree of the air outlet is large enough, the fan of the air conditioner can be controlled to be started to output air, then the air conditioner keeps the air outlet state, and the air deflector continues to rotate to be restored to the first restoration angle, thus completing the restoration of the air deflector. In this way, there is no need to wait for the air deflector to be restored completely before air output, so the waiting time before air output is effectively shortened. Specifically, the rotation angle of the air deflector needs to meet the angle requirement of air output, which can be set according to different types of air conditioners. For example, the first restoration angle can be 90°. In the rotating and restoring process of the air deflector, when the air deflector has rotated by 30°, the fan is started for air output, and the air deflector continues to rotate to 90° to complete the restoration, such that the air deflector can output air while the restoration is going on, the air output efficiency of the air conditioner when turned on immediately after being powered up is improved, the time for users to wait for the air to be output is reduced, and the user experience is improved.

It can be understood that after the air deflector is restored, the air deflector is in an open state, and then the air deflector is controlled to adjust the air outlet angle according to the angle after restoration. It can be understood that after the air deflector is restored, the rotation angle of the air deflector is controlled according to the normal procedure, the air outlet angle of the air conditioner can be adjusted according to a control instruction from the user, and the air deflector is correspondingly adjusted from the position of the first restoration angle, such that the air deflector can quickly rotate to a required target angle. For example, after the air deflector is restored to the first restoration angle, air is output with the current air outlet angle, or after the air deflector is restored to the first restoration angle, the air deflector is rotated and adjusted to the target air outlet angle, which is taken as the air outlet angle of the air deflector. It is easy to understand that after the air deflector is restored, the air conditioner can determine the angular position of the air deflector, so as to quickly control the air deflector for adjustment according to the control instruction, which can improve the response efficiency of the air deflector. In addition, during the process that the air deflector is adjusted from the first restoration angle, that is, the initial angle, to the target angle, the air conditioner maintains the air outlet state, such that the air output of the air conditioner is not affected.

It should be noted that the air deflector is rotatably installed at the air outlet of the air conditioner, and the air outlet can be opened or closed by the air deflector, such that air output of the air outlet can be controlled. As the air outlet is opened by the air deflector, an air guiding effect is enabled, and the air outlet direction can be adjusted. For example, the air deflector can be an air deflector strip, an air deflector plate or other air deflector structures rotatably arranged at the air outlet, which is not further limited herein.

An air deflector plate is taken as an example for illustration. The air deflector plate is rotatably arranged at the air outlet of the air conditioner, and the air conditioner can be a floor-standing air conditioner, a wall-mounted air conditioner, a portable air conditioner, etc. The air outlet direction can be adjusted by adjusting the angle of the air deflector plate.

It can be understood that if the air deflector plate is restored to a position where the air outlet can be closed, that is, a position where the air deflector plate is in a closed state is taken as the initial position, the air deflector plate rotates from the closed state to a position corresponding to the maximum opening angle or the preset angle when the air conditioner is turned on, the rotation angle is large, and the time required is long, thus reducing the air output efficiency. In the embodiment of the present disclosure, at S200, by controlling the air deflector plate to be restored, the restoration position of the air deflector plate is set at the position corresponding to the maximum opening angle, and the air deflector plate is always in an open state after being restored. In the rotating and restoring process of the air deflector plate, once the rotation angle of the air deflector plate meets the air outlet angle requirement, the air deflector plate can output air during restoration, and air can be output without the need to wait for the air deflector plate to be restored, such that the air output efficiency of the air conditioner when turned on immediately after being powered up is improved, the time for users to wait for the air to be output is reduced, and the user experience is improved.

It should be noted that the air deflector plate is installed at the air outlet. Under the limitation of the installation structure, the air deflector plate can rotate within a certain angle range. For example, the air outlet is formed on the housing of the air conditioner, and the air deflector plate is located inside the air outlet. The side of the air outlet will limit the air deflector plate, thus limiting the opening angle and closing angle of the air deflector plate, such that the air deflector plate has a maximum opening angle and a minimum closing angle.

In addition, at S100, the operation state of the air conditioner after being powered up can be determined according to whether the air conditioner receives a control instruction from the user. For example, after the air conditioner is powered up, if the user controls the air conditioner, through a remote control or a button, to be turned on for cooling, heating or air supply, it can be considered that the user needs to turn on the air conditioner immediately after powering it on, and the operation state of the air conditioner can be determined to be the turn-on state in this case. It should be noted that the operation state of the air conditioner refers to the turn-on or turn-off state. The operation state of the air conditioner can be monitored after the air conditioner is powered up, and the air deflector can be controlled according to the operation state of the air conditioner to improve the response efficiency. When the air conditioner is powered up and turned on, the air deflector can be quickly controlled to be restored, and the control efficiency is higher.

Referring to FIG. 2, in this embodiment, S200 includes:

At S210, the air deflector is controlled to be restored according to the operation state. In response to the operation state being a turn-on state, the air deflector is controlled to be restored to the first restoration angle. In response to the air deflector rotating by a first preset angle, the air conditioner is controlled to output air.

It can be understood that in the rotating and restoring process of the air deflector, once the rotation angle of the air deflector meets the air outlet angle requirement, the air conditioner is controlled to output air. Specifically, in response to the air deflector rotating by the first preset angle, the air conditioner can be controlled to output air, where the air deflector rotating by the first preset angle can be understood as the rotation angle of the air deflector being the first preset angle, and the first preset angle can be understood as the rotation angle value of the air deflector. For example, the first preset angle is set as 30°, the first restoration angle is set as 90°, and the initial position of the air deflector is a position greater than 0° and less than 30°. When the air deflector rotates by 30°, the air conditioner starts to output air, the air deflector is at a position greater than 30° and less than 60°, and then the air deflector continues to rotate to 90° for restoration. In this way, air can be output without the need to wait for the air deflector to be restored, and the air output efficiency of the air conditioner when turned on immediately after being powered up is improved.

It should be noted that the air deflector is driven by an electric motor to rotate. After the corresponding first preset angle is set, whether the air deflector rotates by the first preset angle can be determined according to the rotation angle of the air deflector driven by the electric motor. If the air deflector has reached the first restoration angle but the rotation angle of the electric motor has not reached the first preset angle yet, it is necessary to wait for the electric motor to reach the first preset angle, at which moment the air deflector is restored and the air output conditions are met, and then the air conditioner is controlled to output air. Of course, further optimization is possible. When it is determined through detection that the air deflector has rotated by the first restoration angle, it is considered that the air deflector has been restored and the air output conditions are met without the need to wait for the rotation angle of electric motor to reach the first preset angle.

Figure 3:
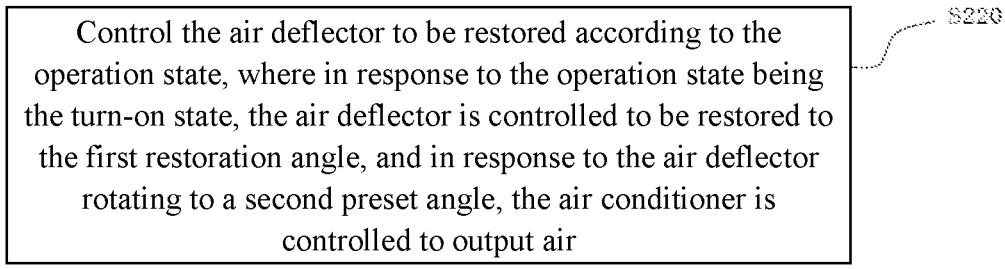
FIG. 3 is a flowchart of air deflector restoration in an air conditioner control method according to another embodiment of the present disclosure.

Referring to FIG. 3, in the embodiment, S200 includes:

At S220, the air deflector is controlled to be restored according to the operation state. In response to the operation state being a turn-on state, the air deflector is controlled to be restored to the first restoration angle. In response to the air deflector rotating to a second preset angle, the air conditioner is controlled to output air.

It can be understood that the difference between S220 and S210 is that in response to the air deflector rotating to the second preset angle, the air conditioner is controlled to output air, where the air deflector rotating to the second preset angle can be understood as the rotation angle of the air deflector has reached the second preset angle, that is, the opening angle of the air deflector is greater than or equal to the second preset angle, and the second preset angle can also be understood as an angle value of the air deflector in the open state. For example, the second preset angle is set as 45°, the first restoration angle is set as 90°, and the initial position of the air deflector is a position less than 45°. When the air deflector rotates to 45°, the air conditioner starts to output air, and then the air deflector continues to rotate to 90° for restoration. In this way, air can be output without the need to wait for the air deflector to be restored. For another example, if the initial position of the air deflector is a position greater than 45°, the opening angle of the air deflector is greater than the second preset angle, the air conditioner is controlled to output air immediately in this case, and the air deflector is controlled to rotate to 90° for restoration, such that the air output efficiency is higher, the time for users to wait for the air to be output when the air conditioner is turned on immediately after being powered up is reduced, and the user experience is improved.

It should be noted that the first preset angle and the second preset angle are both preset values of the air conditioner, and different values are set for the first preset angle and the second preset angle according to the actual application scene and the type of the air conditioner, which will not be described in detail herein.

Considering that the maximum opening angle of the air deflector is limited by a limiting structure, the target air outlet angle is generally set to be less than the maximum opening angle, that is, the air deflector needs to be adjusted to the position of the target air outlet angle after being restored, and then the air outlet angle is adjusted according to the target air outlet angle and the current control instruction. For example, the maximum opening angle of the air deflector plate when restored is 90° and the target air outlet angle of the air deflector plate is set as 45°. When the air conditioner is turned on immediately after being powered up, the air deflector plate is controlled to be restored to 90°, and then the air deflector plate is controlled to rotate to 45°, such that the air deflector plate can be quickly adjusted, which results in high air output efficiency, steady operation of the air deflector and a long service life of the electric motor.

Figure 4:
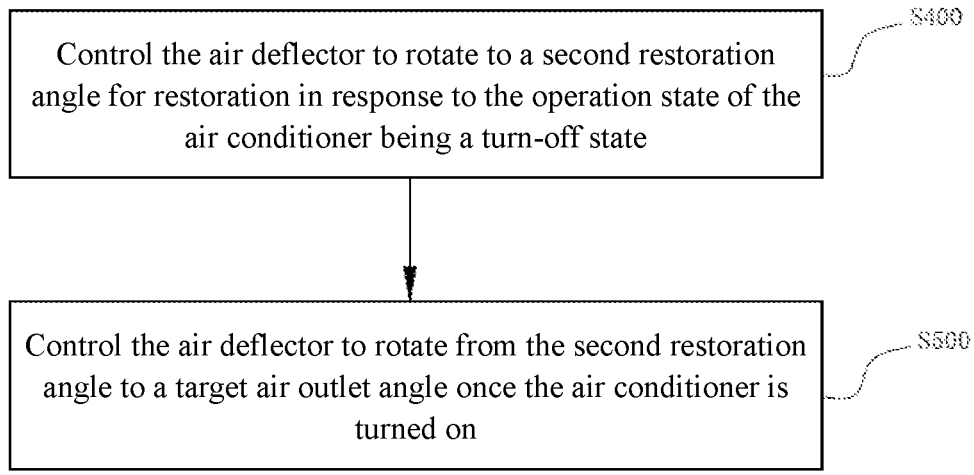
FIG. 4 is a flowchart of restoration in a turn-off state in an air conditioner control method according to an embodiment of the present disclosure.

Referring to FIG. 4, in some embodiments, the air conditioner control method further includes the following steps.

At S400, in response to the operation state of the air conditioner being a turn-off state, the air deflector is controlled to rotate to a second restoration angle for restoration.

At S500, the air deflector is controlled to rotate from the second restoration angle to a target air outlet angle once the air conditioner is turned on.

It can be understood that when the air conditioner is powered up but not turned on, the air deflector is controlled to be restored, and the restoration position is the position where the air deflector rotates to the second restoration angle. The second restoration angle is the minimum closing angle of the air deflector when the air deflector closes the air outlet. The air deflector is in a state of completely closing the air outlet at the minimum closing angle, that is, in the turn-off state, the position where the air deflector is closed is taken as the initial position. After the air deflector is restored in the turn-off state, the air deflector is closed at the minimum closing angle. At this point, the air conditioner is controlled not to output air when the air deflector is closed. After the air conditioner is turned on, the air deflector is controlled to rotate from the initial position to the target air outlet angle to output air.

The operation state of the air conditioner is obtained after the air conditioner is powered up. In response to the operation state of the air conditioner being a turn-off state, the air deflector is controlled to rotate to a completely closed state for restoration. In response to the operation state of the air conditioner being a turn-on state, the air deflector is controlled to rotate from the minimum closing angle to the target air outlet angle, such that the air outlet can be closed by the air deflector to be protected from dust, etc. It should be noted that the closed state of the air deflector can be understood as a completely closed or partially closed state, and can also be understood as the air outlet being completely closed or partially closed. In this way, the second restoration angle of the air deflector can be greater than the minimum closing angle, that is, the air deflector can be restored without being completely closed or under the condition that the air outlet is partially opened, which can be set according to different types of air conditioners. The control method is flexible.

Figure 5:
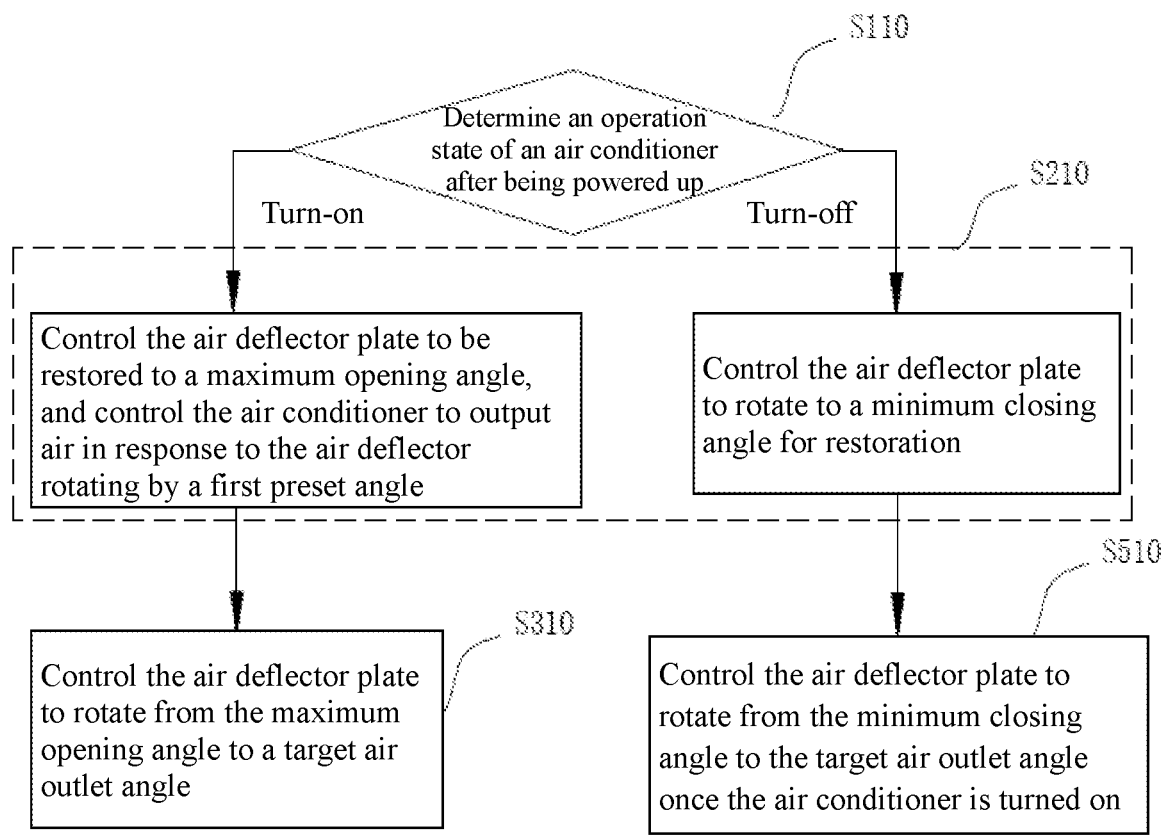
FIG. 5 is a flowchart of air deflector restoration in an air conditioner control method according to yet another embodiment of the present disclosure.

Referring to FIG. 5, taking an air deflector plate as an example, the air conditioner control method includes but is not limited to the following steps.

At S110, an operation state of an air conditioner after being powered up is determined.

At S210, in response to the air conditioner being in the turn-on state, the air deflector plate is controlled to be restored to the maximum opening angle, in response to the air deflector rotating by a first preset angle, the air conditioner is controlled to output air, and S310 is executed after the restoration. In response to the air conditioner being a turn-off state, the air deflector plate is controlled to rotate to the minimum closing angle for restoration, and S510 is executed.

At S310, the air deflector plate is controlled to rotate from the maximum opening angle to a target air outlet angle.

At S510, when the air conditioner is turned on, the air deflector plate is controlled to rotate from the minimum closing angle to the target air outlet angle.

It can be understood that the air deflector plate has two different restoration positions, and corresponding positions are selected for restoration according to different situations. For example, the maximum opening angle of the air deflector plate is set as 90°, the minimum closing angle is set as 0°, the first preset angle is set as 20°, and the target air outlet angle of the air deflector plate is set as 45°. If the air conditioner is turned on immediately after being powered up, the air deflector plate is located at a position less than 20°, and the air deflector plate is controlled to be restored to the maximum opening angle 90°. When the air deflector plate rotates by 20°, the fan is controlled to be started to output air. At this point, the air deflector plate continues to rotate to 90°, and finally the air deflector plate is controlled to rotate from 90° to 45°, so that the air deflector plate can be quickly adjusted, the time for users to wait for the air to be output is reduced, and the air output efficiency is higher. If the air conditioner is in the turn-off state after being powered up, the air deflector plate is controlled to be restored to the minimum closing angle 0°, and the air deflector plate is controlled to rotate to 45° to output air after the air conditioner is turned on.

It can be understood that, the rotation angle range designed for the air deflector varies with different types of air conditioners. It should be noted that the rotation direction of the air deflector can be clockwise or counterclockwise. For example, the air deflector plate rotates counterclockwise in the opening process and clockwise in the closing process, such that when being controlled to be restored, the air deflector plate can rotate to the maximum opening angle for restoration in the counterclockwise direction and to the minimum closing angle for restoration in the clockwise direction. In addition, the maximum opening angle and the minimum closing angle mentioned in the above embodiment should be understood as taking an angle where the air deflector plate is in the closed state as a reference angle, that is, an angle where the air deflector plate is completely closed is taken as the minimum closing angle. Whether the air deflector plate is in the horizontal position or not, the minimum closing angle is set as 0°, without referring to the angle of the air deflector plate relative to the horizontal direction. The rotation angle of the air deflector plate ranges from the minimum closing angle to the maximum opening angle.

For example, at S200, controlling the air deflector to be restored includes:

At S211, the air deflector is controlled to be restored according to the operation state. In response to the operation state being a turn-on state, the air deflector plate is controlled to be restored to the first restoration angle in the counterclockwise direction. In response to the air deflector plate rotating by the first preset angle in the counterclockwise direction, the air conditioner is controlled to output air.

For example, at S400, controlling the air deflector to be restored includes:

At S411, in response to the operation state of the air conditioner being a turn-off state, the air deflector plate is controlled to rotate clockwise to a second restoration angle for restoration.

It can be understood that after the air conditioner is powered up, when the air deflector is in an unrestored state, the air deflector restoration step in the above embodiment is executed. When it is detected that the air deflector has been restored after the air conditioner is powered up, that is, the air deflector is at the maximum opening angle or the minimum closing angle, it is unnecessary to continue to execute the corresponding restoration operation.

Figure 6:
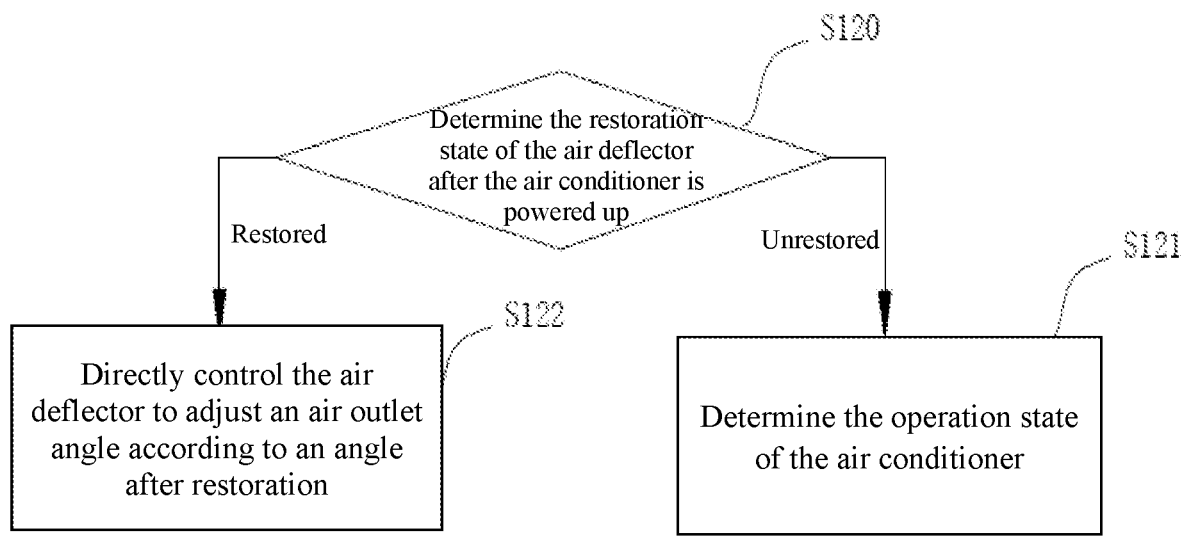
FIG. 6 is a flowchart of determining a restoration state in an air conditioner control method according to an embodiment of the present disclosure.

Referring to FIG. 6, in the embodiment, S100 includes:

At S120, the restoration state of the air deflector after the air conditioner is powered up is determined.

At S121, the operation state of the air conditioner is determined in response to the restoration state being an unrestored state.

At S122, the air deflector is directly controlled to adjust the air outlet angle according to the angle after restoration in response to the restoration state being a restored state.

It can be understood that after the air conditioner is powered up, the restoration state of the air deflector is obtained first to determine whether the air deflector has been restored. When the air deflector is in an unrestored state, the operation state of the air conditioner is determined to check whether the air conditioner is turned on, so as to control the air deflector to be restored according to the operation state of the air conditioner, that is, S200 and related steps shown in the above embodiment, thus allowing the air deflector to be restored. When the air deflector is in a restored state, there is no need to perform the corresponding restoration operation, that is, S200 and related steps shown in the above embodiment are not performed. In this case, the air outlet angle is adjusted according to the angle of the air deflector after restoration. It should be noted that the condition for determining whether the air deflector is restored at S120-S122 is whether the air deflector is at the first restoration angle or the second restoration angle, that is, when the air deflector is at the first restoration angle or the second restoration angle, it can be considered that the restoration has been completed. For example, after the air conditioner is powered up, when the air deflector is at the first restoration angle, it is determined that the restoration has been completed, and air output of the air conditioner is controlled according to the current angle of the air deflector. When the air deflector is located at the second restoration angle, it is determined that the restoration has been completed, and at this point, the air deflector is in a closed state, and the air deflector is controlled to be open to the target air outlet angle to output air when the air conditioner is turned on.

Figure 7:
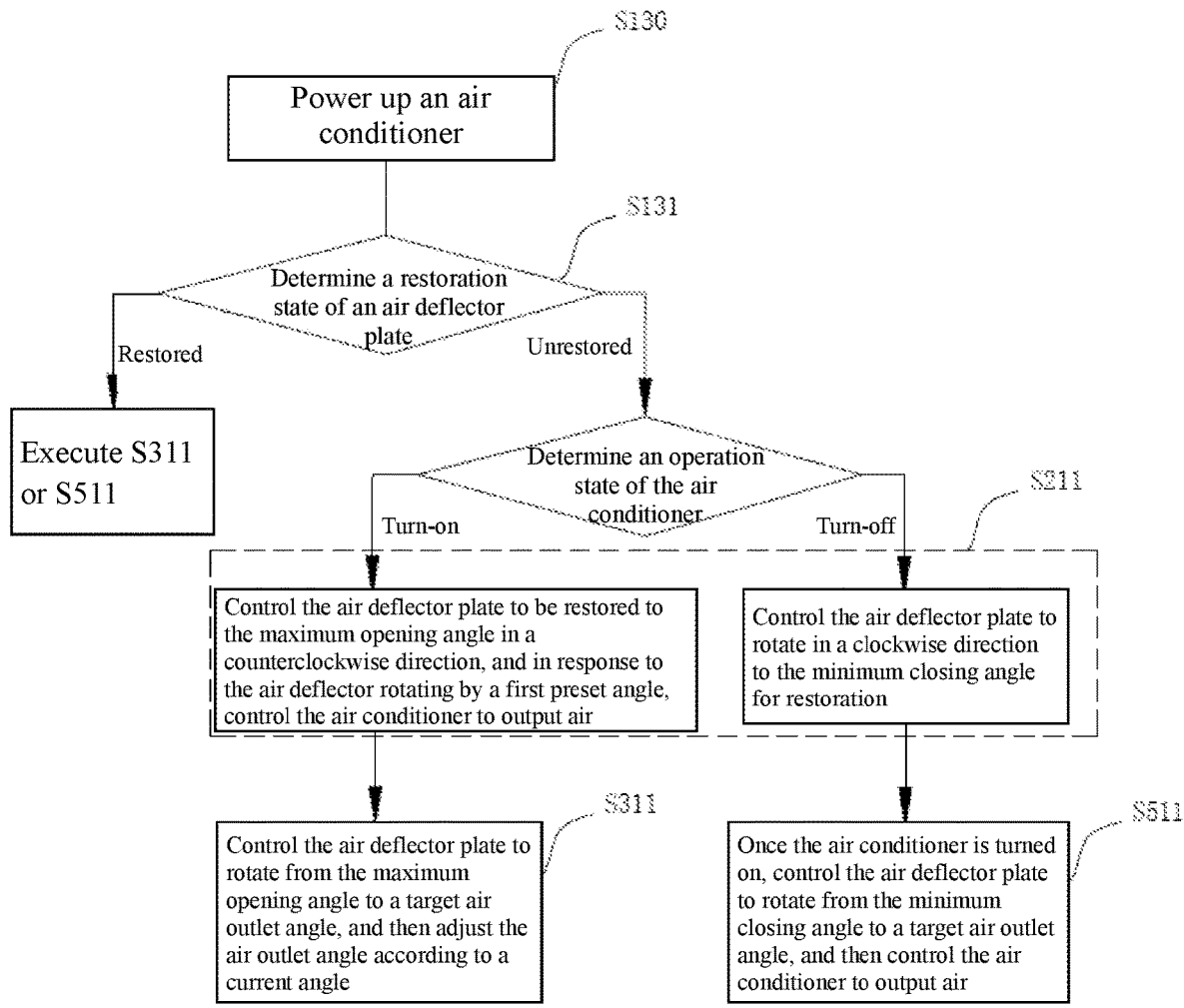
FIG. 7 is a flowchart of an air conditioner control method according to another embodiment of the present disclosure.

Referring to FIG. 7 which is a flowchart of an air conditioner control method according to an example of the present disclosure. The air conditioner control method includes the following steps.

At S130, the air conditioner is powered up.

At S131, the restoration state of the air deflector is determined. In response to the restoration state being an unrestored state, S211 is executed; or in response to the restoration state being a restored state, S311 or S511 is executed.

At S211, in response to the air conditioner being in the turn-on state, the air deflector plate is controlled to be restored to the maximum opening angle in the counterclockwise direction, and in response to the air deflector rotating by a first preset angle, the air conditioner is controlled to output air, and S311 is executed after the restoration;

in response to the air conditioner being a turn-off state, the air deflector plate is controlled to rotate in the clockwise direction to the minimum closing angle for restoration, and S511 is executed.

At S311, the air deflector plate is controlled to rotate from the maximum opening angle to the target air outlet angle, and then the air outlet angle is adjusted according to the current angle.

At S511, once the air conditioner is turned on, the air deflector plate is controlled to rotate from the minimum closing angle to the target air outlet angle, and then the air conditioner is controlled to output air.

The air conditioner according the embodiment of the present disclosure is described with reference to FIGS. 8-13, to which the air conditioner control method in the above embodiment can be applied, where the air conditioner can be a floor-standing air conditioner, a wall-mounted air conditioner, a ceiling-mounted air conditioner, a portable air conditioner, etc.

Figure 8:
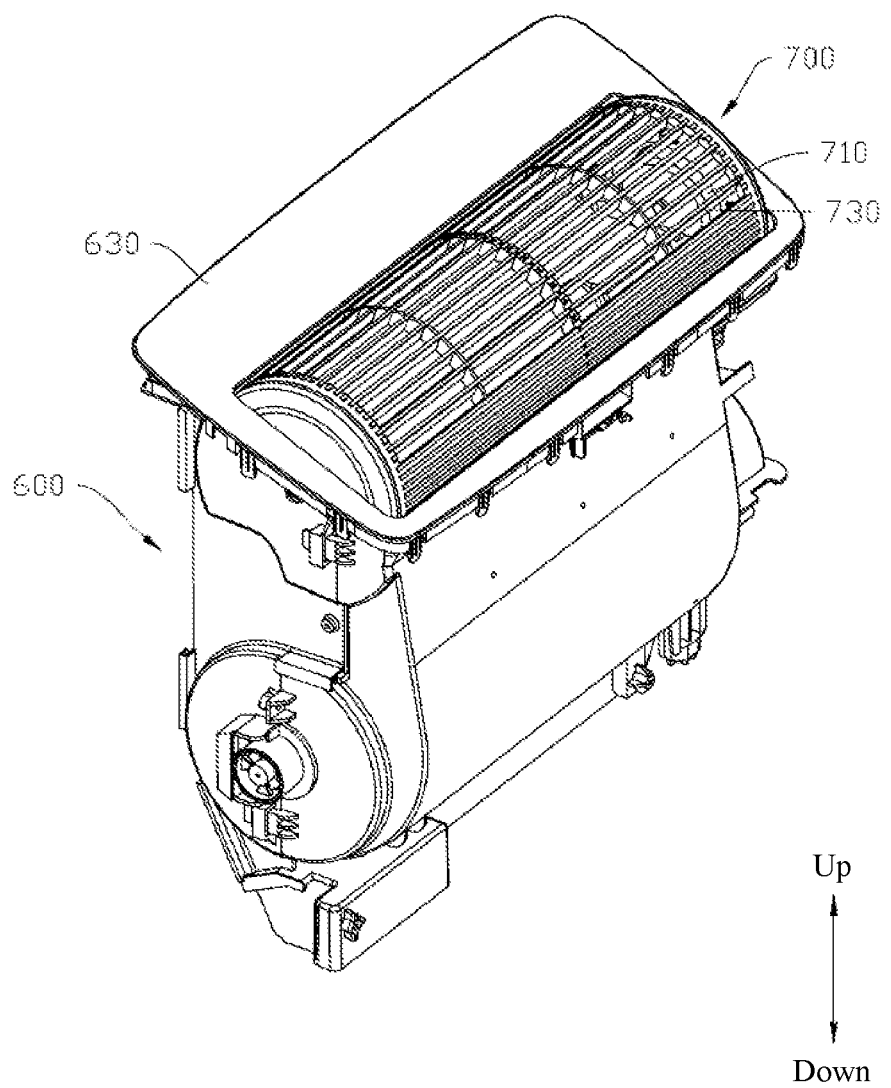
FIG. 8 is a schematic diagram of a portable air conditioner according to an embodiment of the present disclosure.
Figure 9:
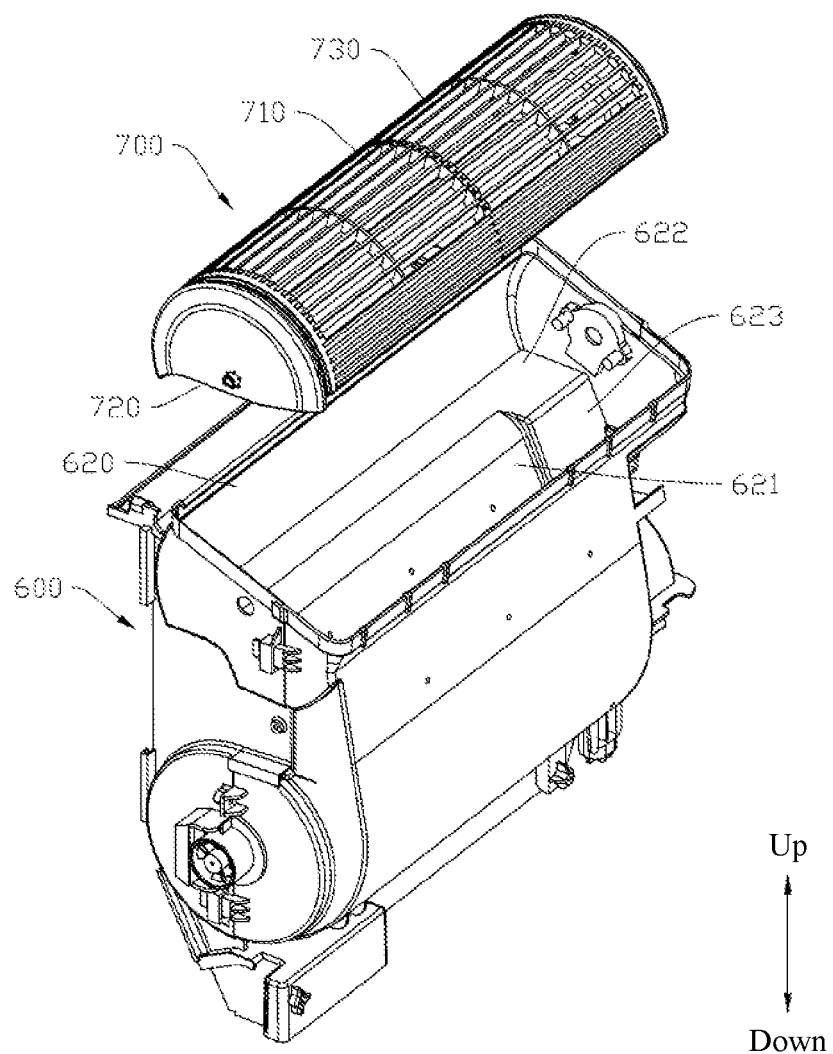
FIG. 9 is an exploded view of a portable air conditioner according to an embodiment of the present disclosure.
Figure 11:
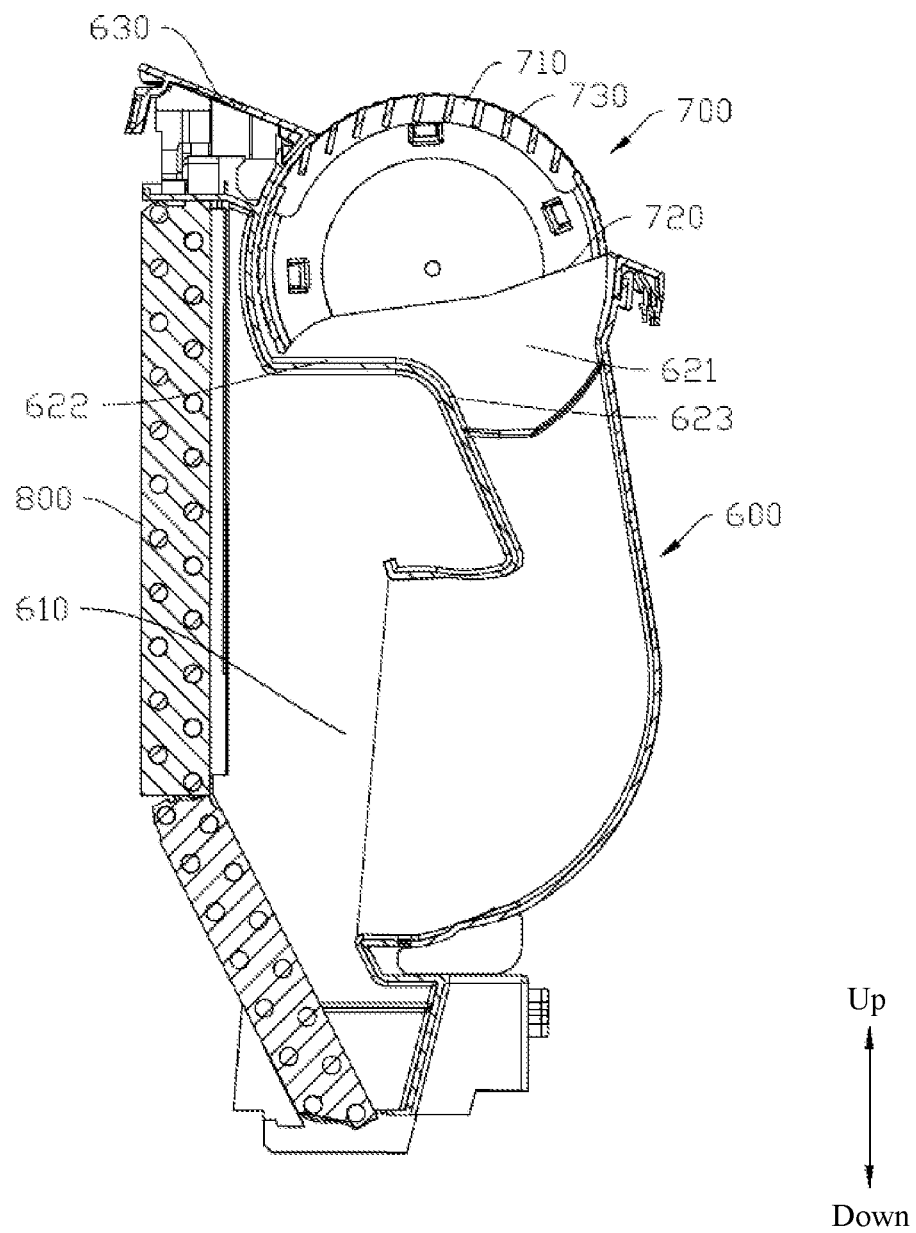
FIG. 11 is a sectional view of an air outlet hood taken along section line A-A in FIG. 10, with the air outlet hood restored at a maximum opening angle.

Referring to FIGS. 8, 9 and 11, the embodiment of the present disclosure is described by taking a portable air conditioner as an example. The portable air conditioner includes a machine body, an air outlet housing 600 is arranged in the machine body, an air inlet 610 is arranged at one end of the air outlet housing 600, and an air outlet 620 is arranged at the other end. Here, the air inlet 610 sends the air passing through a heat exchanger 800 from the air inlet 610 to the air outlet housing 600 through a fan, and the air is blown out through the air outlet 620. The structure of the fan is not shown in the drawings. An air deflector is arranged at the air outlet 620, air outlet vents 710 are formed in the air deflector, and the air outlet direction of the air outlet vent 710 can be adjusted by rotating the air deflector. The air deflector can be an air deflector plate, an air deflector strip, etc.

Figure 10:
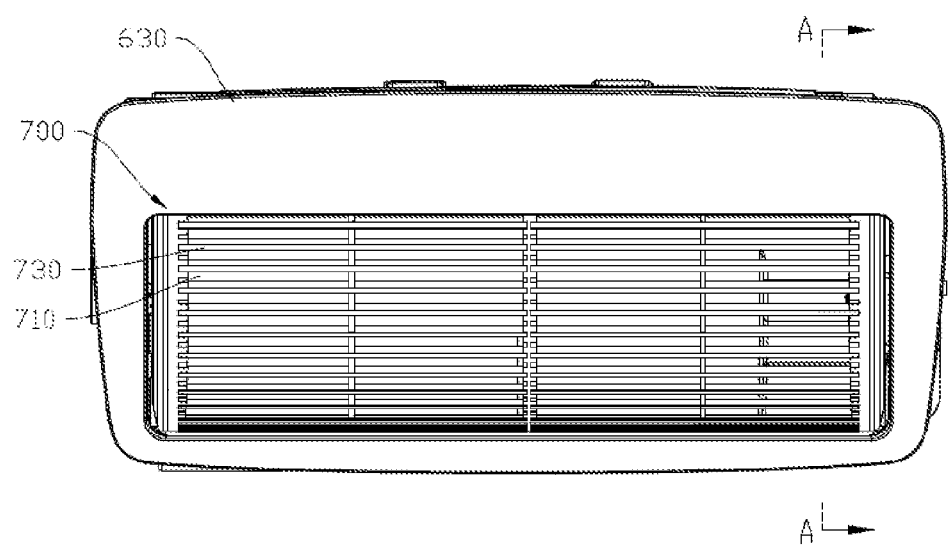
FIG. 10 is a top view of a portable air conditioner according to an embodiment of the present disclosure.

Referring to FIGS. 8, 9 and 10, in this embodiment, the air deflector adopts the structure of an air outlet hood 700, which is in the shape of a drum, and the surface of the air outlet hood 700 is an arc surface. One side of the air outlet hood 700 is provided with an opening 720 communicating with an inner cavity of the air outlet housing 600, the air outlet vent 710 is formed on the arc surface, and the air outlet vent 710 communicates with the opening 720. A cavity 621 matching the air outlet hood 700 is arranged at the air outlet 620, and the air outlet hood 700 is rotatably arranged in the cavity 621. The air outlet hood 700 covers the air outlet 620, a panel 630 is arranged on the air outlet 620, and part of the air outlet hood 700 protrudes from the panel 630. By rotating the air outlet hood 700, the direction of the air outlet vent 710 can be changed, thereby achieving the purpose of adjusting the air outlet direction. It should be noted that a plurality of grilles 730 are arranged on the arc surface, and the air outlet vents 710 are formed by arranging the grilles 730 at intervals, such that the air outlet vents 710 are evenly distributed along the arc surface, which can improve the air outlet uniformity and the air outlet effect.

It can be understood that when the air outlet hood 700 rotates in the cavity 621, the air outlet angle of the air outlet vent 710 will change. In an embodiment, the air outlet 620 is located at the top of the machine body, and the rotation of the air outlet hood 700 can be controlled to make the air outlet vent 710 blow forward or upward. When the air outlet hood 700 rotates to make the air outlet vent 710 face the outside of the machine body, the air outlet hood 700 is in a state of opening the air outlet vent 710. When the air outlet hood 700 rotates to make the air outlet vent 710 face the inside of the cavity 621, the air outlet hood 700 is in a state of closing the air outlet vent 710. It should be noted that the closing state of the air outlet hood 700 can be understood as closing all the air outlet vents 710 or only closing part of the air outlet vents 710. In this embodiment, when the air outlet hood 700 is in the closing state, only part of the air outlet vents 710 are closed, and the other part of the air outlet vents 710 can still output air. In addition, the arc surface of the air outlet hood 700 conforms to the shape of an inner wall of the cavity 621, such that the surface of the air outlet hood 700 can move close to the inner wall of the cavity 621 during rotation, which can prevent air from leaking between the air outlet hood 700 and the inner wall of the cavity 621, so as to improve the structural reliability.

Figure 12:
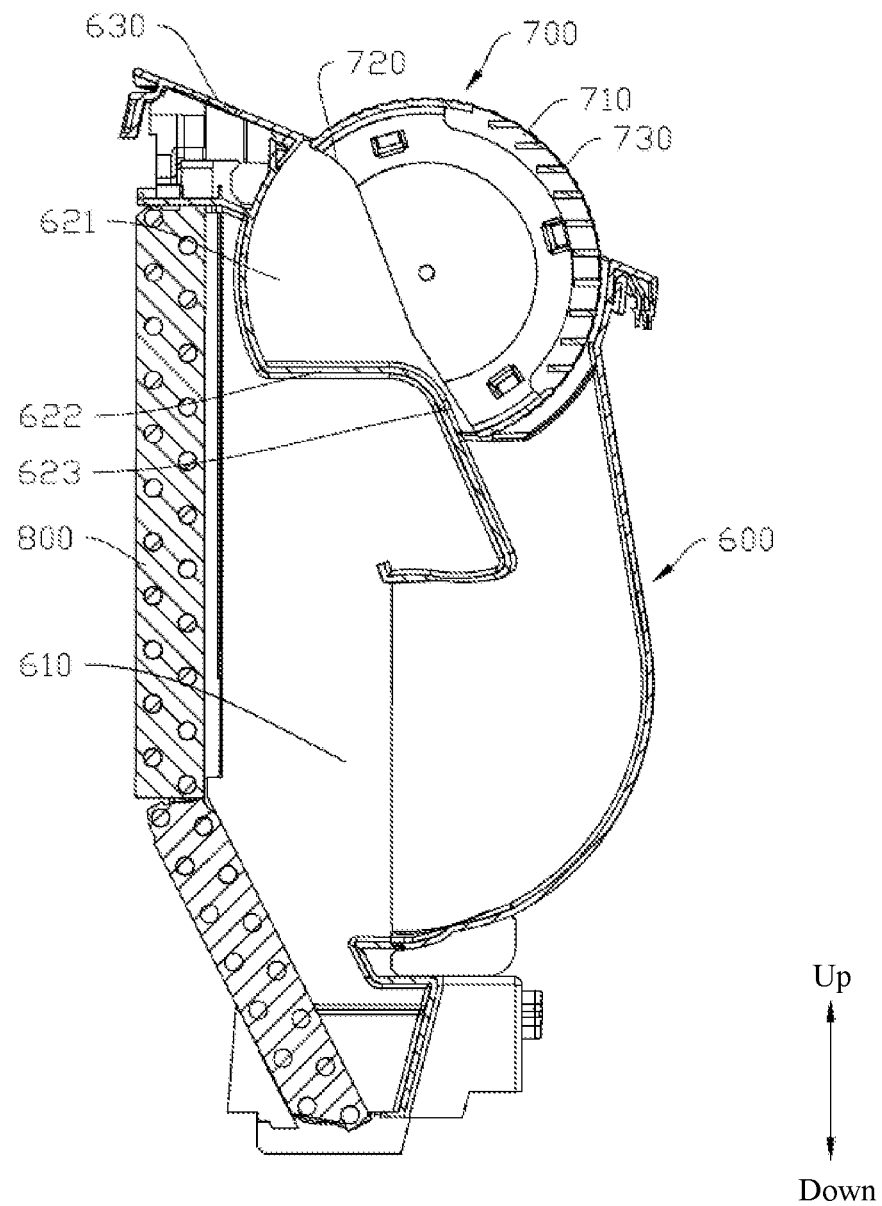
FIG. 12 is a sectional view of an air outlet hood taken along section line A-A in FIG. 10, with the air outlet hood restored at a minimum closing angle.

As shown in FIGS. 9, 11 and 12, it should be noted that a limiting structure is arranged inside the air outlet 620, the rotation angle of the air outlet hood 700 can be limited by the limiting structure, and the angle of the air outlet hood 700 can be understood as an air outlet angle of the air outlet vent 710. By means of the limiting structure, the air outlet hood 700 can have two terminal positions in the rotation direction, that is, the air outlet hood 700 has a maximum opening angle and a minimum closing angle, such that the air outlet hood 700 can rotate within the angle range defined by the limiting structure. In this embodiment, a first boss 622 and a second boss 623 are arranged inside the cavity 621. The first boss 622 limits the maximum opening angle of the air outlet hood 700, and the second boss 623 limits the minimum closing angle of the air outlet hood 700.

Referring to FIGS. 11 and 12, it can be understood that the air outlet hood 700 rotates in the counterclockwise direction to the maximum opening angle, which is a first restoration angle of the air outlet hood 700, as shown in FIG. 11. The air outlet hood 700 rotates in the clockwise direction to the minimum closing angle, which is a second restoration angle of the air outlet hood 700, as shown in FIG. 12. It can be understood that the flow of controlling the portable air conditioner by the air conditioner control method of the above embodiment includes: after the portable air conditioner is powered up, obtaining an operation state of the portable air conditioner and determining whether the portable air conditioner is turned on; controlling the air outlet hood 700 to be restored to the first restoration angle in response to the operation state of the portable air conditioner being a turn-on state; controlling a fan to be started to output air in response to the air outlet hood 700 rotating by a first preset angle during rotation; and controlling the air outlet hood 700 to rotate from the first restoration angle to a target air outlet angle after the air outlet hood 700 is restored, referring to the control steps of the embodiment shown in FIG. 5.

In the embodiment, the horizontal direction is taken as a reference direction. As shown in FIG. 11, the maximum opening angle of the air outlet hood 700 of the portable air conditioner is 78°, and as shown in FIG. 12, the minimum closing angle is 0°. The first preset angle of the air outlet hood 700 is set as 30°, and the target air outlet angle is set as 60°. If the air outlet hood 700 is at a position less than 20° when the portable air conditioner is turned on immediately after being powered up, the fan is controlled to be started to supply air after the air outlet hood 700 is controlled to rotate in the counterclockwise direction by 30°, and the air outlet hood 700 continues to rotate to 78° to be restored, and then rotate from 78° to 60°, such that air can be output quickly during the restoration process of the air outlet hood 700, and the air output efficiency is high.

Figure 13:
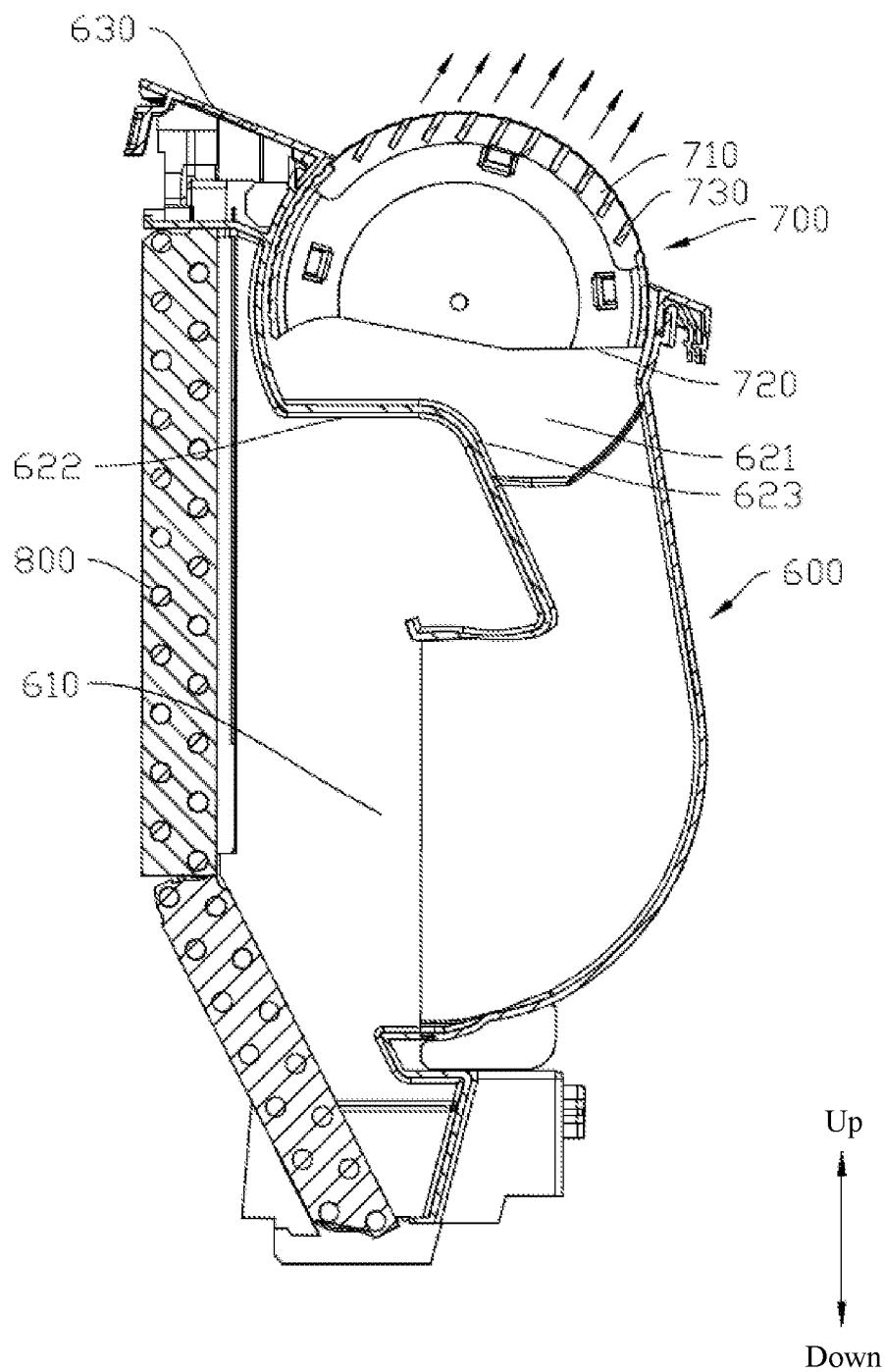
FIG. 13 is a sectional view of an air outlet hood taken along section line A-A in FIG. 10, with the air outlet hood in an air outlet state.

Referring to FIG. 13, it should be noted that in this embodiment, after the portable air conditioner is powered up, the air outlet hood 700 is controlled to rotate to the first restoration angle or the second restoration angle for restoration. When the portable air conditioner is turned on, the air outlet hood 700 will rotate from the first restoration angle or the second restoration angle to the target air outlet angle. When the air outlet hood 700 is located at the target air outlet angle, the air outlet hood 700 can also adjust the air outlet angle according to the demand of the user, such that the air outlet hood 700 can quickly respond to a control instruction, for example, the air outlet hood 700 can rotate back and forth to output air.

It can be understood that when the portable air conditioner is powered up but still in the turn-off state, the air outlet hood 700 is controlled to rotate to the second restoration angle for restoration, that is, the air outlet hood 700 is in a closing state; and after the portable air conditioner is turned on, the air outlet hood 700 is controlled to rotate from the minimum closing angle to open to output air. It should be noted that the air outlet hood 700 can be controlled to be completely closed or partially closed.

It should be noted that the control method of the portable air conditioner can be learned by referring to the method steps S100 to S300 in FIG. 1, S210 in FIG. 2, S220 in FIGS. 3, S400 to S500 in FIGS. 4, S110 to S510 in FIGS. 5, S120 to S510 in FIG. 6, and S130 to S511 in FIG. 7, which will not be repeated herein.

In addition, an embodiment of the present disclosure also provides a control apparatus, including: a memory, a processor, and a computer program stored in the memory and executable by the processor. The processor and the memory may be connected by a bus or by other means.

As a non-transitory computer-readable storage medium, the memory can be used to store a non-transitory software program and a non-transitory computer-executable program. In addition, the memory may include a high-speed random access memory and a non-transitory memory, for example, at least one magnetic disk storage device, a flash memory device, or another non-transitory solid-state storage device. In some implementations, the memory includes memories remotely located with respect to the processor, and these remote memories may be connected to the processor via a network. Examples of the above-mentioned network include the Internet, an intranet, a local area network, a mobile communication network, and a combination thereof.

Non-transient software programs and instructions required to implement the air conditioner control method in any of the above embodiments are stored in the memory, and when executed by the processor, cause the processor to perform the air conditioner control method in any of the above embodiments, for example, execute the above-described method steps S100 to S300 in FIG. 1, S210 in FIG. 2, S220 in FIGS. 3, S400 to S500 in FIGS. 4, S110 to S510 in FIGS. 5, S120 to S510 in FIG. 6, or S130 to S511 in FIG. 7.

The apparatus embodiments described above are only for illustration. The units described as separate components may or may not be physically separated, that is, they may be located at one place or distributed to multiple network units. Some or all of the modules can be selected according to actual needs to achieve the purpose of this embodiment.

Furthermore, an embodiment of the present disclosure also provides a computer-readable storage medium storing computer-executable instructions which, when executed by a processor or controller, for example, the processor in any of the above-mentioned embodiments of the air conditioner, can cause the processor to perform the air conditioner control method in any of the above embodiments, for example, to perform the above-described method steps S100 to S300 in FIG. 1, S210 in FIG. 2, S220 in FIGS. 3, S400 to S500 in FIGS. 4, S110 to S510 in FIGS. 5, S120 to S510 in FIG. 6, or S130 to S511 in FIG. 7.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software can be distributed on computer-readable media, which can include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information transmission media.

The above is a detailed description of some implementations of the present disclosure, but the present disclosure is not limited to the above-mentioned embodiments. Those having ordinary skill in the art can also make various equivalent modifications or replacements without departing from the scope of the present disclosure, and these equivalent modifications or replacements are all included in the scope defined by the claims of the present disclosure.

What is claimed is:

1. An air conditioner control method comprising:
   determining an operation state of an air conditioner after the air conditioner is powered up;
   controlling an air deflector rotatably installed at an air outlet of the air conditioner to restore according to the operation state, including, in response to the operation state being a turn-on state:
   controlling the air deflector to restore to a restoration angle, the restoration angle being a maximum opening angle of the air deflector when opening to expose the air outlet; and
   during rotation of the air deflector, controlling air output of the air conditioner according to a rotation angle of the air deflector, including:
   while the air deflector rotates towards the restoration angle, in response to the rotation angle of air deflector being equal to or greater than an angle smaller than the restoration angle, controlling a fan of the air conditioner to start to output air while controlling the air deflector to continue to rotate towards the restoration angle; and
   controlling the air deflector to adjust an air outlet angle according to an angle after restoration.

2. The air conditioner control method of claim 1, wherein:
   the restoration angle is a first restoration angle; and
   controlling the air deflector to restore according to the operation state further includes:
   controlling the air deflector to rotate to a second restoration angle in response to the operation state being a turn-off state, the second restoration angle being greater than or equal to a minimum closing angle of the air deflector required to close the air outlet.

3. The air conditioner control method of claim 2, wherein controlling the air deflector to adjust the air outlet angle according to the angle after restoration includes:
   controlling the air deflector to rotate from the second restoration angle to a target air outlet angle after the air conditioner is turned on, the target air outlet angle being greater than the minimum closing angle.

4. The air conditioner control method of claim 1, wherein determining the operation state of the air conditioner includes:
   determining a restoration state of the air deflector; and
   determining the operation state of the air conditioner in response to the restoration state being an unrestored state.

5. The air conditioner control method of claim 4, wherein determining the restoration state of the air deflector includes:
   directly controlling the air deflector to adjust the air outlet angle according to the angle after restoration in response to the restoration state being a restored state.

6. The air conditioner control method of claim 1, wherein controlling the air deflector to adjust the air outlet angle according to the angle after restoration includes:
   controlling the air deflector to rotate from the restoration angle to a target air outlet angle, the target air outlet angle being smaller than or equal to the maximum opening angle.

7. A non-transitory computer-readable storage medium storing computer-executable instructions configured for implementation of the air conditioner control method of claim 1.

8. The air conditioner control method of claim 1, wherein:
   the air deflector is controlled to start to rotate towards the restoration angle at a first time;
   the air output of the air conditioner is controlled to start at a second time, the second time being later than the first time; and
   the air deflector arrives at the restoration angle at a third time, the third time being later than the second time.

9. A control apparatus comprising:
   a memory storing a computer program; and
   a processor configured to execute the computer program to:
   determine an operation state of an air conditioner after the air conditioner is powered up;
   control an air deflector rotatably installed at an air outlet of the air conditioner to restore according to the operation state, including, in response to the operation state being a turn-on state:
   control the air deflector to restore to a restoration angle, the restoration angle being a maximum opening angle of the air deflector when opening to expose the air outlet; and
   during rotation of the air deflector, control air output of the air conditioner according to a rotation angle of the air deflector, including:
   while the air deflector rotates towards the restoration angle, in response to the rotation angle of air deflector being equal to or greater than an angle smaller than the restoration angle, controlling a fan of the air conditioner to start to output air while controlling the air deflector to continue to rotate towards the restoration angle; and
   control the air deflector to adjust an air outlet angle according to an angle after the air deflector is restored.

10. An air conditioner comprising:
    an air outlet;
    an air deflector rotatably installed at the air outlet; and
    a control apparatus including:
    a memory storing a computer program; and
    a processor configured to execute the computer program to:
    determine an operation state of the air conditioner after the air conditioner is powered up;
    control the air deflector to restore according to the operation state, including, in response to the operation state being a turn-on state:
    control the air deflector to restore to a restoration angle, the restoration angle being a maximum opening angle of the air deflector when opening to expose the air outlet; and
    during rotation of the air deflector, control air output of the air conditioner according to a rotation angle of the air deflector, including:
    while the air deflector rotates towards the restoration angle, in response to the rotation angle of air deflector being equal to or greater than an angle smaller than the restoration angle, controlling a fan of the air conditioner to start to output air while controlling the air deflector to continue to rotate towards the restoration angle; and
    control the air deflector to adjust an air outlet angle according to an angle after the air deflector is restored.

* * * * *